United States Patent
Liu et al.

(10) Patent No.: US 9,681,481 B2
(45) Date of Patent: Jun. 13, 2017

(54) MOBILITY MANAGEMENT OF WIRELESS NETWORKS BASED ON MULTIPATH TRANSFER CONTROL PROTOCOL

(71) Applicant: AT&T Intellectual Property I, L.P., Atlanta, GA (US)

(72) Inventors: Cheng Liu, Atlanta, GA (US); Zhi Cui, Sugar Hill, GA (US); Liza Fung, Edison, NJ (US); Vinod Pandey, Eden Prairie, MN (US); Paul E. Smith, Jr., Rockwall, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 177 days.

(21) Appl. No.: 14/576,630

(22) Filed: Dec. 19, 2014

(65) Prior Publication Data

US 2016/0183129 A1 Jun. 23, 2016

(51) Int. Cl.
*H04W 76/02* (2009.01)
*H04W 36/00* (2009.01)
*H04W 80/06* (2009.01)

(52) U.S. Cl.
CPC ..... *H04W 76/025* (2013.01); *H04W 36/0027* (2013.01); *H04W 80/06* (2013.01)

(58) Field of Classification Search
None
See application file for complete search history.

(56) References Cited

U.S. PATENT DOCUMENTS

| | | |
|---|---|---|
| 6,108,300 A | 8/2000 | Coile et al. |
| 6,965,584 B2 | 11/2005 | Agrawal et al. |
| 8,428,024 B2 | 4/2013 | Haddad |
| 8,767,625 B2 | 7/2014 | Krishnaswamy et al. |

(Continued)

FOREIGN PATENT DOCUMENTS

| | | |
|---|---|---|
| EP | 2740254 A1 | 6/2014 |
| WO | 2013176588 A1 | 11/2013 |

(Continued)

OTHER PUBLICATIONS

Bagnulo, M., et al. "Boosting mobility performance with Multi-Path TCP," Future Network & MobileSummit 2010 Conference proceedings, pp. 1-8.

(Continued)

*Primary Examiner* — Gary Mui
(74) *Attorney, Agent, or Firm* — Zagorin Cave LLP (57) ABSTRACT

Mobile management in a cellular network utilizes the multipath-transfer control protocol (MP-TCP). A mobile device establishes a first multipath-transfer control protocol (MP-TCP) subflow to a corresponding node using a first internet protocol (IP) address corresponding to the mobile device. At least a portion of the first IP address is uniquely associated with the first coverage area. The mobile device establishes a second MP-TCP subflow using a second IP address corresponding to the mobile device while the mobile device is in an overlapped coverage area including a first portion of the first coverage area and a second portion of a second coverage area. At least a portion of the second IP address is uniquely associated with the second coverage area. The mobile node turns off the first subflow when the mobile node determines it has left the first coverage area.

13 Claims, 8 Drawing Sheets

(56) References Cited

U.S. PATENT DOCUMENTS

| | | | |
|---|---|---|---|
| 8,811,329 B2 | 8/2014 | Haddad | |
| 2011/0252151 A1 | 10/2011 | Lu et al. | |
| 2012/0144062 A1 | 6/2012 | Livet et al. | |
| 2012/0188979 A1* | 7/2012 | Haddad | H04W 76/043 370/331 |
| 2012/0196600 A1* | 8/2012 | Mizukoshi | H04L 61/20 455/435.1 |
| 2012/0226802 A1* | 9/2012 | Wu | H04L 1/1825 709/224 |
| 2012/0258674 A1 | 10/2012 | Livet et al. | |
| 2012/0271938 A1 | 10/2012 | Livet et al. | |
| 2012/0275323 A1 | 11/2012 | Reznik et al. | |
| 2012/0290700 A1* | 11/2012 | Li | H04L 61/10 709/223 |
| 2013/0275609 A1 | 10/2013 | Cui et al. | |
| 2014/0010207 A1 | 1/2014 | Horn et al. | |
| 2014/0045491 A1 | 2/2014 | Van Phan et al. | |
| 2014/0080484 A1 | 3/2014 | Centonza et al. | |
| 2014/0153489 A1 | 6/2014 | Perras et al. | |
| 2014/0169330 A1 | 6/2014 | Rommer et al. | |
| 2014/0204927 A1 | 7/2014 | Horn et al. | |
| 2014/0206361 A1 | 7/2014 | Centonza et al. | |
| 2014/0219242 A1 | 8/2014 | Perras et al. | |
| 2014/0321503 A1 | 10/2014 | Niederberger et al. | |
| 2014/0351447 A1* | 11/2014 | Annamalaisami | H04L 65/1069 709/227 |
| 2014/0362765 A1* | 12/2014 | Biswas | H04W 76/026 370/328 |
| 2015/0201046 A1* | 7/2015 | Biswas | H04L 69/321 370/329 |
| 2015/0350337 A1* | 12/2015 | Biswas | H04L 67/142 709/228 |
| 2016/0037428 A1* | 2/2016 | Kanugovi | H04L 69/16 370/329 |
| 2016/0095019 A1* | 3/2016 | Cui | H04W 36/0011 370/331 |
| 2016/0127889 A1* | 5/2016 | Cui | H04W 36/08 370/328 |
| 2016/0212759 A1* | 7/2016 | Schliwa-Bertling | H04L 69/14 |

FOREIGN PATENT DOCUMENTS

| | | |
|---|---|---|
| WO | 2014044333 A1 | 3/2014 |
| WO | 2014090335 A1 | 6/2014 |
| WO | 2014092626 A1 | 6/2014 |

OTHER PUBLICATIONS

Kim, J. and Koh, S., "Mobile Oriented Future Internet (MOFI): Architectural Design and Implementations," ETRI Journal, vol. 35, No. 4, Aug. 2013, pp. 666-676.

Raiciu, C., et al., "Opportunistic Mobility with Multipath TCP," Proceedings of the sixth international workshop on MobiArch. ACM, 2011. http://www-malted.cs.ucl.ac.uk/staff/M.Handley/papers/mobiarch2011.pdf, University Politehnica of Bucharest, pp. 1-6.

Singh, A., et al., "Heterogeneous Access: Survey and Design Considerations," Columbia University, 2013, http://academiccommons.columbia.edu/download/fedora_content/download/ac:167866/Content/cucs-028-13.pdf, 15 pages.

Sousa, B., et al., "Multihoming Management for Future Networks," Mobile Networks and Applications 16.4 (2011). http://www.researchgate.net/publication/227316923_Multihoming_Management_for_Future_Networks/file/79e4150cf356b9d1f4.pdf, pp. 505-517.

Yousaf, M., et al., "An architecture for exploiting multihoming in mobile devices for vertical handovers & bandwidth aggregation." Wireless Personal Communications 66.1 (2012), 23 pages.

Ford, A., et al., "Architectural Guidelines for Multipath TCP Development," Internet Engineering Task Force (IETF) (RFC 6182), Mar. 2011, 1-28.

Thomson, S., et al., "IPv6 Stateless Address Autoconfiguration," Network Working Group (RFC 4862), Sep. 2007, pp. 1-30.

* cited by examiner

MOBILITY MANAGEMENT OF WIRELESS NETWORKS BASED ON MULTIPATH TRANSFER CONTROL PROTOCOL

BACKGROUND

Field of the Disclosure

This disclosure relates to mobility management in wireless networks and more particularly to mobility management using a multi-path transfer control protocol.

Description of the Related Art

Figure 1:
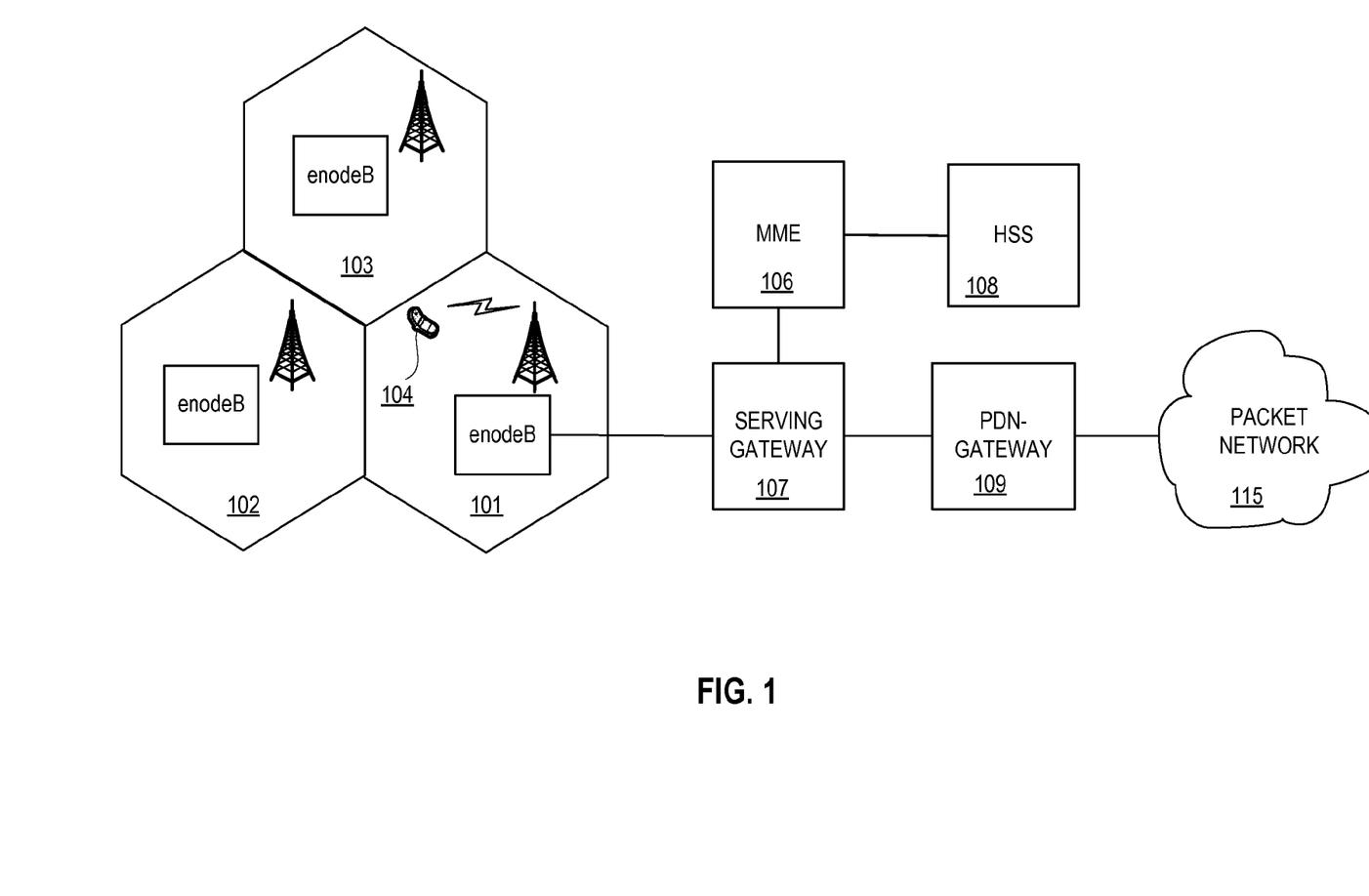
FIG. 1 illustrates a high level diagram of current LTE architecture.

Current long term evolution (LTE) networks maintain significant "state" information such as PDP Contexts, Bearers, access point names (APNs), General Packet Radio Services (GPRS) Tunnelling Protocol (GTP) tunnels, in network equipment. Most of the "states" are used to provide seamless mobility as devices move through coverage areas of the network. FIG. 1 illustrates a high level block diagram of an LTE network including cells 101, 102, 103, each with an enodeB to provide radio access. In addition to the RF portion of the network, the LTE network includes the evolved packet core (EPC) also shown in the high level block diagram of FIG. 1. The EPC includes the serving gateway (S-gateway) 107, the mobility management entity (MME) 106, the Home Subscriber Server (HSS) 108 and the packet data network (PDN) gateway 109. The HSS 108 provides information relating to subscribers. The PDN-gateway 109 is coupled to the packet network 115, which may be, e.g., the internet. The MME provides mobility management for the network including tracking location of device 104. The serving gateway communicates with the enodeB and acts as a local anchor for communications with the enodeB. More than one enodeB is typically served by the serving gateway. The PDN-gateway 109 acts as a gateway to packet networks such as the internet. The PDN-gateway 109 also assigns internet protocol (IP) addresses to the mobile devices and serves as an IP anchor. When a mobile device moves to a different serving gateway, the IP packets still flow through the PDN-gateway 109 (thus functioning as the anchor) and the same IP address is maintained using GTP-tunnel based approach to mobility management.

With the current GTP-tunnel based approach to mobility management, the PDN-gateway 109 acts as the anchor point and assigns the internet protocol (IP) address to the mobile device for use in the IP session while the mobile device is in the cell 101 served by the evolved nodeB. If the mobile device moves from coverage area 101 to another coverage area 102, the IP session is handed off to the new enodeB and the IP address assigned by the PDN gateway 109 is maintained in the new cell to maintain session continuity. There is significant amount of network equipment required to maintain the session continuity. Today's GTP tunnel based interface leads to a close bonding between the radio access network (RAN) and packet core network, which makes it very difficult to evolve separately and interwork with other radio access technologies (RATs) (e.g. Wireless local area network (LAN)). The approach was designed for backward compatibility and does not scale well with billions of emerging internet connected devices.

The current GTP tunnel based mobility management approach used in 4G-LTE networks does not scale effectively in fixture 5G networks with billions of emerging devices. Further, given many devices are stationary or occasionally mobile (and may not require session continuity while being mobile), current requirements to maintain significant state information become more difficult with the tremendous scaling expected of internet connected devices.

Accordingly, a more effective approach for mobility management in future networks is desirable.

SUMMARY OF EMBODIMENTS

In one embodiment a method includes establishing a first multipath-transfer control protocol (MP-TCP) subflow to a corresponding node from a mobile device using a first internet protocol (IP) address corresponding to the mobile device in a first coverage area served by first cell site equipment. The mobile device establishes a second MP-TCP subflow using a second IP address corresponding to the mobile device while the mobile device is in an overlapped coverage area including a first portion of the first coverage area and a second portion of a second coverage area served by second cell site equipment.

In another embodiment a mobile device includes multi-path transfer control protocol (MP-TCP) processing logic responsive to a request for a TCP-IP connection to establish a first multipath-transfer control protocol (MP-TCP) subflow to a corresponding node using a first IP address associated with first cell site equipment while the mobile device is in a first coverage area served by the first cell site equipment. The MP-TCP processing logic is further responsive to the mobile device being in an overlapped coverage area between the first coverage area served by the first cell site equipment and a second coverage area served by a second cell site equipment, to cause the mobile device to establish a second MP-TCP subflow using a second IP address associated with the second cell site.

In another embodiment a method includes establishing a first multipath-transfer control protocol (MP-TCP) subflow to a corresponding node from a mobile device in a first coverage area using a first IP address associated with the coverage area. The mobile device establishing a second MP-TCP subflow using a second IP address associated with a second coverage area in response to the mobile device moving to an overlapped coverage area between the first coverage area and the second coverage area.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

One or more embodiments are now described with reference to the drawings, wherein like reference numerals are generally used to refer to like elements throughout. In the following description, for purposes of explanation, numerous details are set forth in order to provide a thorough understanding of the various embodiments. It is evident, however, that the various embodiments can be practiced without these details.

In order to deal with the scaling of devices connected to the network, an "access-agnostic" core network is desirable for 5G that can interface with various access networks using standard internet protocol/Ethernet interface. The reference to 5G is intended to mean a generic term for the network or networks that replaces current 4G/LTE networks. The new mobility management method of 5G should scale effectively with billions of emerging devices, simplify the architecture and reduce states that need to be maintained by the network. The new mobility management approach should facilitate easy inter-RAT inter-working based on standard IP/Ethernet interface. Scaling effectively requires only using "state" when needed and simplifying the network architecture and reducing signaling overhead. One way to achieve such goals is to utilize multi-path transmission control protocol (MP-TCP) for mobility management.

By leveraging the MP-TCP protocol for intra-cellular mobility, the conventional GTP-tunnel based mobility management, which requires extensive state maintenance and signaling overhead, is no longer needed. Therefore, MP-TCP provides a simple solution for mobility management of 5G networks. In addition, MP-TCP is based on standard IP/Ethernet interface that can easily support interworking with other radio access techniques.

Use of MP-TCP for mobility management has advantages compared to conventional GTP-tunnel based mobility management. For example, by eliminating the GTP tunnel, corresponding network equipment or functionality within equipment such as the S-gateway, PDN-gateway, and the MME, and associated mobility management signaling will no longer be needed. Thus, mobility management of user equipment, including GTP-tunnel setup and update will no longer be found in the S-Gateway, PDN gateway and MME. In the new mobility network paradigm using MP-TCP, new virtualized network functions (NFV) running on commercial off-the-shelf (COTS) servers may be used to realize necessary network functions (such as billing, quality of service (QoS), etc.) while the mobility management utilizes MP-TCP. Use of MP-TCP for mobility management simplifies network architecture, minimizes signaling exchange, and reduces states to be maintained in the network. Based on standard IP/Ethernet interface, MP-TCP can be used without any change for intra-cellular and inter-RAT mobility. MP-TCP Proxy solves the issues of server backward compatibility, and gives more control of traffic engineering to network operators.

Before illustrating how MP-TCP can be applied for mobility management a brief overview of MP-TCP is provided. A Transmission Control Protocol (TCP) session is defined as a communication link between two applications using TCP as the communication protocol. TCP traditionally restricts the communication link to a single path per TCP session. In contrast, MP-TCP, defined in IETF RFC 6182, allows multiple paths in a single TCP session. MP-TCP has been considered a solution for wireless local area network (WLAN) off-loading and inter-radio access technology (RAT) roaming. The main idea is to use multiple paths concurrently for a transport-layer connection. Two key benefits are an increase in the resilience of the connectivity by providing multiple paths and an increase in the efficiency of the resource usage, and thus increasing the network capacity available to end hosts.

Figure 2:
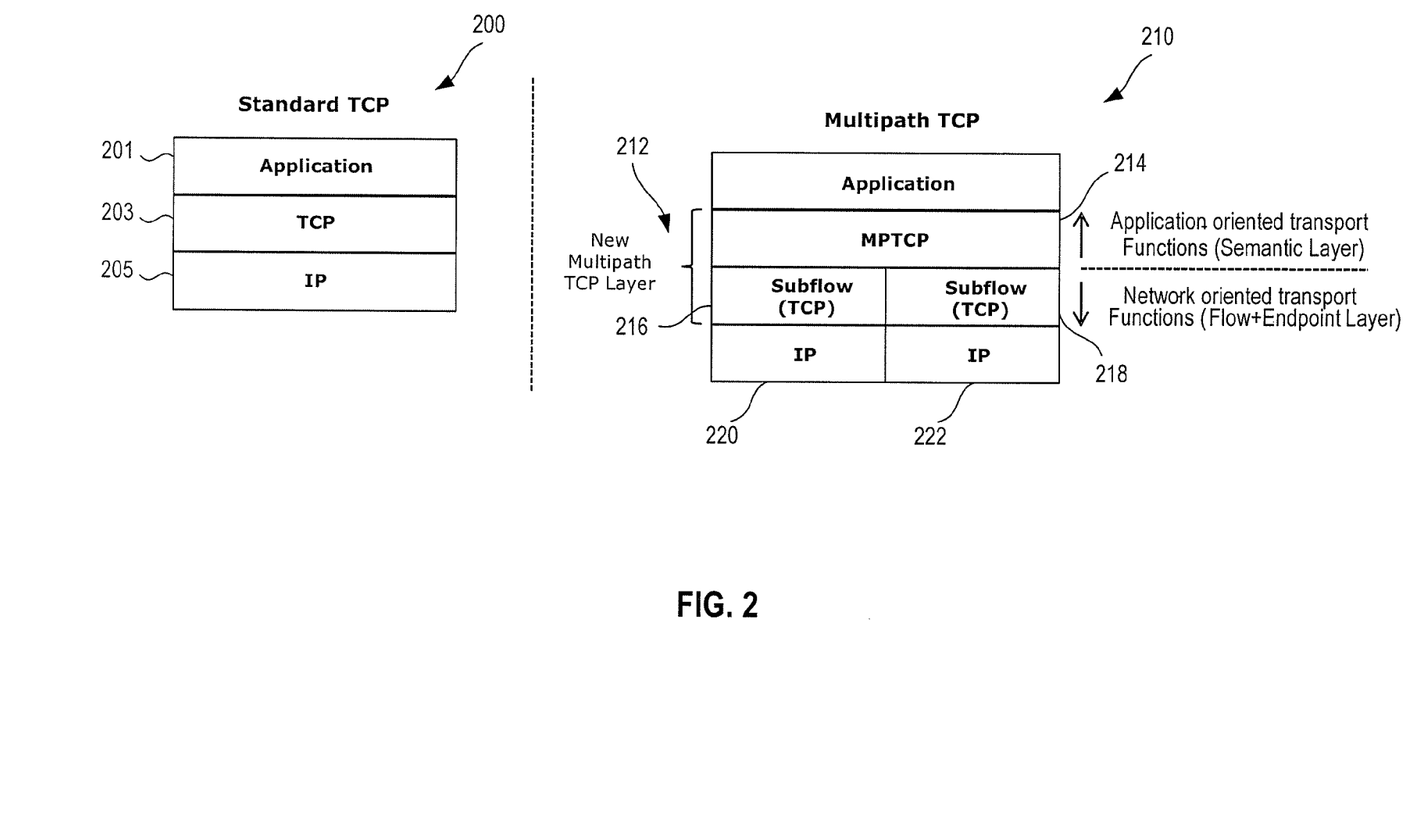
FIG. 2 illustrates a comparison of standard TCP and MP-TCP protocol stacks.

FIG. 2 illustrates a comparison of standard TCP and MP-TCP protocol stacks. The standard TCP protocol stack 200 includes the application layer 201, the TCP layer 203, and the IP layer 205. The multipath TCP protocol stack 210 includes a new multipath TCP layer 212 including MP-TCP 214 and Subflows 216 and 218 under which are IP layers 220 and 222. In a physical packet, the MP-TCP-layer signaling is piggybacked in TCP subflow options. MP-TCP layer 214 manages multiple TCP subflows below it. The MP-TCP implements functions including: (1) Path Management, (2) Path Scheduling, (3) Subflow Interface, (4) Congestion Control. Each Subflow (TCP) is a standard TCP session to provide the underlying transport per path. It uses standard TCP and operates over an individual path.

Figure 3:
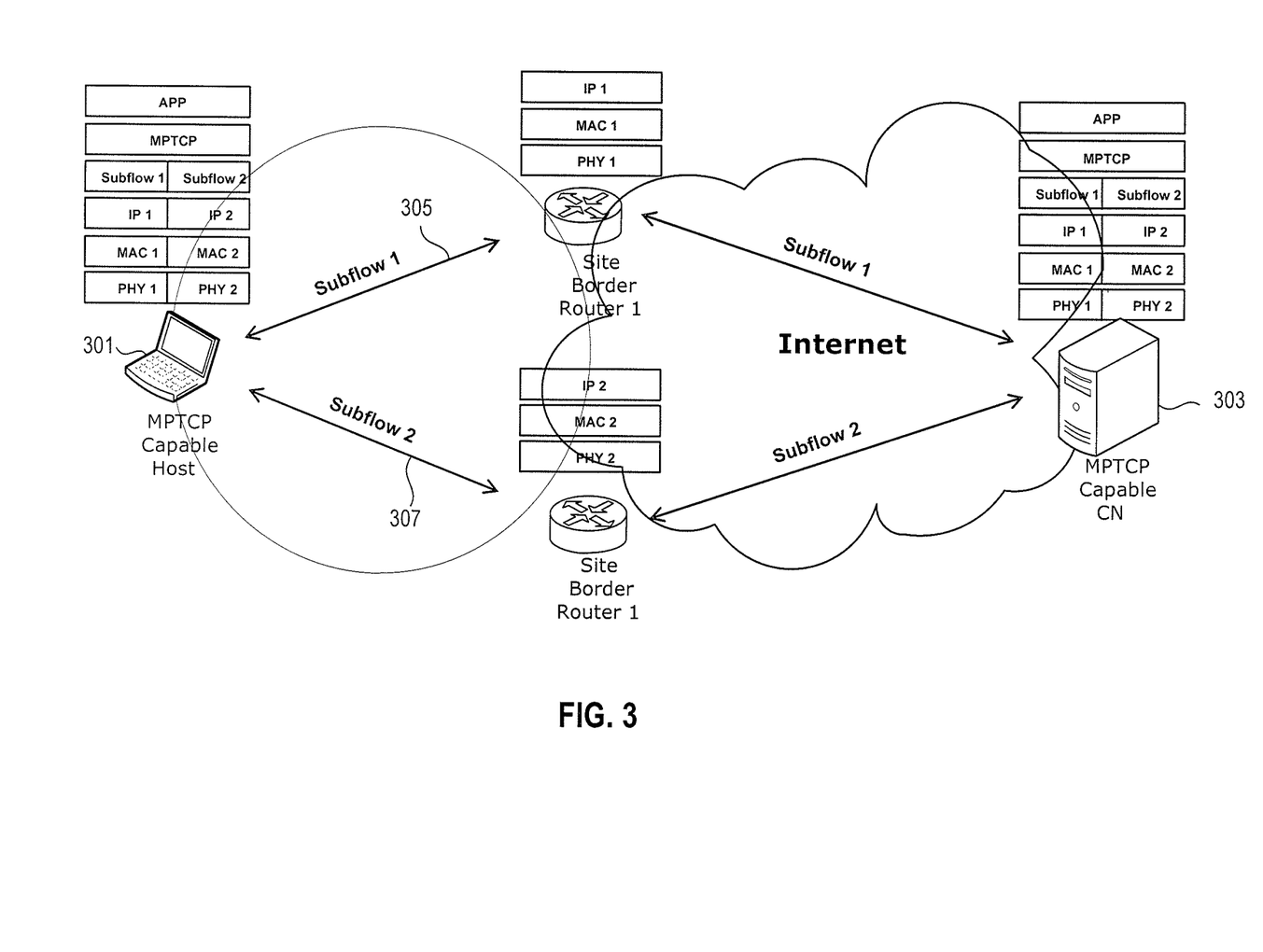
FIG. 3 illustrates an example of a single MP-TCP session.

FIG. 3 illustrates an example of a single MP-TCP session between hosts 301 and remote host (also referred to herein corresponding node (CN)) 303 that includes multiple subflows. Host 301 establishes subflow 1 305 and subflow 2 307 to the corresponding node 303. Note that both ends of the system (host 301 and corresponding node 303) have to be MP-TCP capable in order to use MP-TCP. If not, the connection falls back to the standard single-path TCP as defined in IETF RFC 6182. Alternatively, as explained further herein, a proxy may be used if the remote host 303 is not MP-TCP capable. Note that the TCP session may only include a single subflow. The concurrent multiple paths for the transport-layer connection provide increased resilience of the connectivity by providing multiple paths and increase the efficiency of the resource usage, and thus increase the network capacity available to end hosts.

The MP-TCP layer of the host 301 is responsible for detecting and setting up new paths (path management), breaking application-layer byte stream into segments for each subflow (packet scheduling), reassembling and re-ordering subflow segments into connection-level data stream (subflow interface), and coordinating congestion control across subflows (congestion control). Congestion control is a typical feature of conventional single-path TCP accomplished by checking acknowledgements (ACKs) between the two end hosts. In the MP-TCP case, there are two levels of acknowledgement (at the subflow level and at the connection-level). Details about congestion control in MP-TCP can be found in IETF RFC 6824 Section 3.3. Other approaches to congestion control may be utilized to augment congestion control capabilities found in MP-TCP so the host knows which radio network is congested. For example, the cellular network can indicate its congestion condition to the user equipment (UEs) under network coverage. Also a WLAN access point (AP) can indicate congestion conditions using lower layer protocols such as hotspot 2.0 capabilities, etc.

Figure 4:
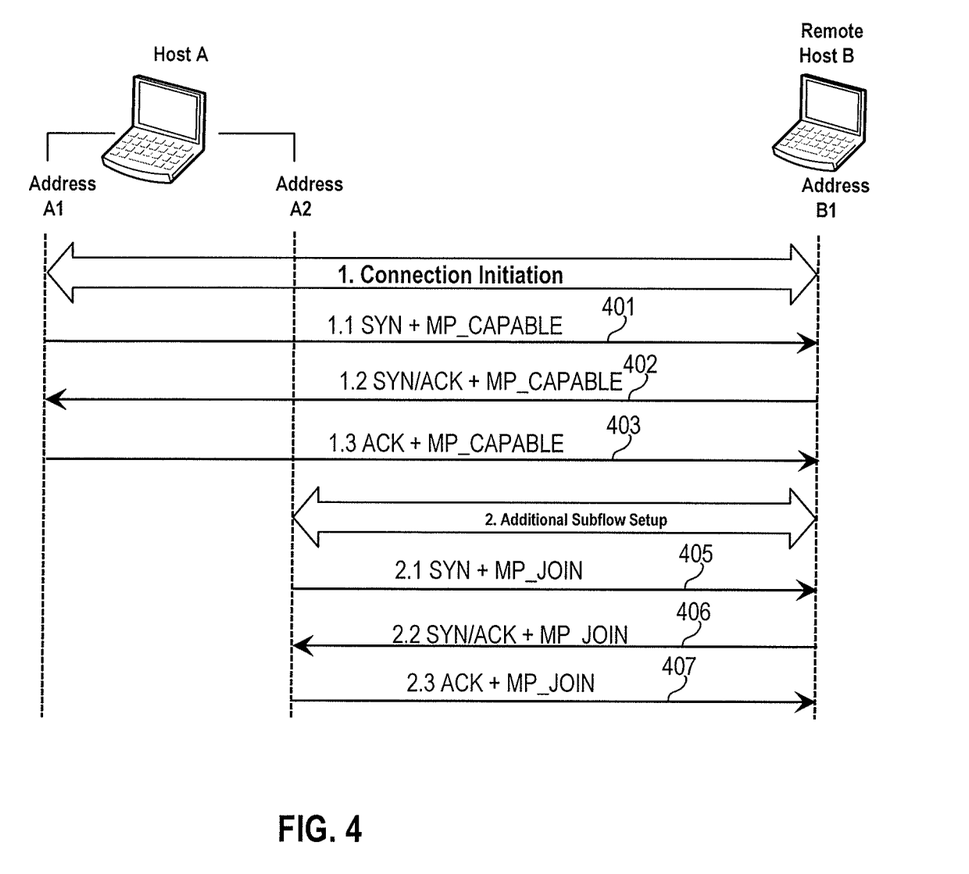
FIG. 4 illustrates a control plane overview for connection initiation and additional subflow setup for MP-TCP.

FIG. 4 illustrates a control plane overview for connection initiation and additional subflow set up between Host A and remote Host B. The signaling for starting the first subflow of MP-TCP between IP address A1 of host A to IP address B1 of remote host B is similar to the standard TCP (3-way handshake), except a MP_CAPABLE message 401 is included in the TCP option to test whether the remote host supports MP-TCP. If the remote host is not MP-TCP capable, or if the path does not support the MP-TCP option (e.g., a network middlebox strips the "unknown" TCP option), the connection will fall back to standard TCP. Otherwise, the remote host response at 402 includes MP_CAPABLE in the SYN/ACK packet. The connection initiation concludes with an acknowledge at 403.

If Host A has another IP address A2 that can be used, host A can initiate a new subflow similar to the first subflow. An MP_JOIN message is included in the TCP option shown at 405, and is used to authenticate and identify which MP-TCP connection it is joining. At 406 the remote host B acknowledges and the additional subflow set up concludes at 407 to establish a new subflow using a second IP address A2 for host A and the same IP address B1 for remote host B. Alternatively, Host A may want to advertise (using ADD_ADDR in TCP option) to the remote host the availability of an address without establishing a new subflow. Then the remote Host B may later initiate a subflow to this address. If the new path is not MP-TCP capable, the new subflow will be closed. Note that MP-TCP operations (e.g. MP_CAPABLE, MP_JOIN, ADD_ADDR, REMOVE_ADDR, etc.) are signaled within TCP Option Header Kind #30.

MP-TCP has been considered as an alternative solution to provide traffic offloading from cellular to local area networks. However, using MP-TCP for intra-cellular mobility management has not been considered. Given the fact that existing GTP-tunnel based intra-cellular mobility management does not scale effectively with many emerging devices in 5G, MP-TCP can be used in new networks as a mobility management protocol for both intra-cellular mobility and inter-RAT mobility.

Figure 5:
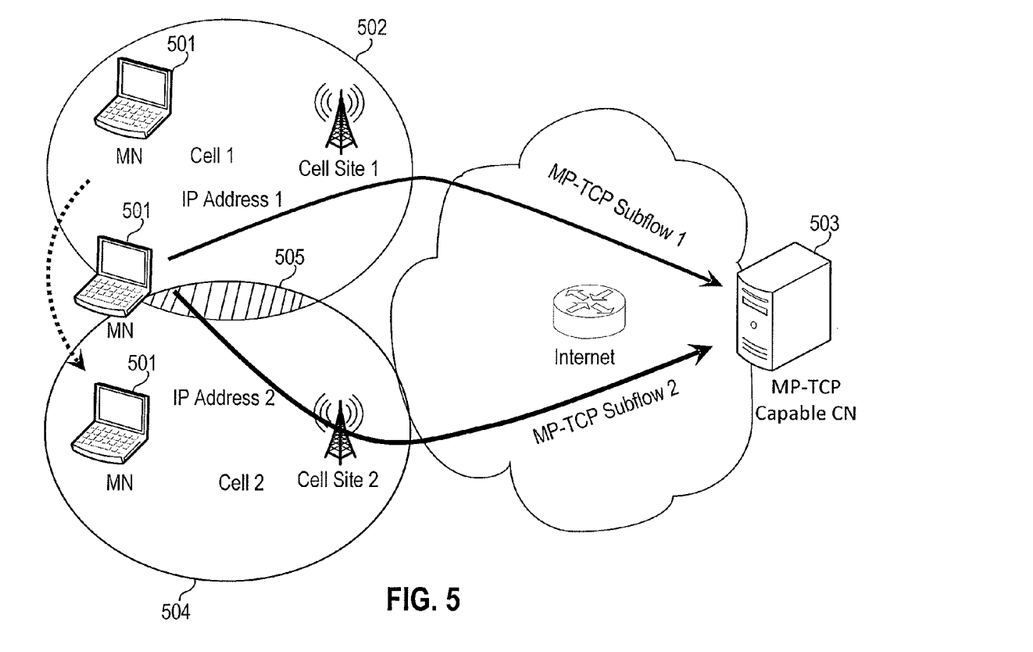
FIG. 5 illustrates use of MP-TCP for mobility management.

Several implementation scenarios are considered for using MP-TCP for Intra-cellular mobility. FIG. 5 illustrates Intra-Cellular mobility management using MP-TCP. Referring to FIG. 5 mobile node (MN) 501 is initially cell 1 502. While in cell 1, mobile node 501 utilizes IP address 1. There are several ways the IP address may be assigned as discussed further herein. MN 501 and corresponding node (CN) 503 are both MP-TCP capable. Before moving, MN 501 is in cell 1 area only and establishes one MP-TCP subflow (MP-TCP Subflow 1) using IP address 1 in accordance with the handshake shown in FIG. 4. Note that a portion of IP address 1. e.g., a prefix forming a part of the IP address, is unique to each cell site.

During mobility, as the mobile node 501 moves towards cell 2 504, mobile node 501 traverses the overlapped coverage area 505. At the overlapped coverage area, MN uses a new IP address 2 to establish a new MP--TCP subflow MP-TCP Subflow 2 using IP address 2, while maintaining the original subflow of IP address 1. Note that IP address 2 has a portion of the address that is unique to cell 2. The two IP addresses are used simultaneously for the MP-TCP connection. However, for smooth handover, MP-TCP control logic in mobile node 501 should be able to dynamically shift traffic load between the two paths based on signal strength, mobility pattern, etc. Both the mobile node and the corresponding node have the control logic for traffic load balancing and congestion control (which happens at layer 4 and above), while the cell sites serve as "dumb" pipes to provide layer 1-3 connectivity.

After the mobile node 501 completely moves out of the cell 1 coverage area, the mobile node 501 closes the first MP-TCP subflow, and switches to single-path TCP using IP address 2 only. The mobile node 501 may make the determination to close the first MP-TCP subflow based, e.g., on the signal strength of signaling from cell 1 being below a predetermined threshold or other criteria related to cell 1 and/or cell 2.

There are several ways the IP address can be obtained by the mobile node 501. In one embodiment, the each cell site broadcasts its prefix on a control channel. The mobile node within a particular cell then forms an IP address based on the prefix and a value determined by the mobile device such as a value based on the media access control (MAC) address of the mobile node. The MAC address of each mobile node should be unique. In this embodiment, the IP address allocation approach described is based on the IPv6 Stateless Address Autoconfiguration (SLAAC), defined in IETF RFC 4862 and applied to the wireless link. When the mobile device reaches the overlapped area 505 and receives the cell 2 prefix over a cell 2 control channel, the mobile device can form the second IP address and request radio resources from cell 2 to establish the second MP-TCP subflow.

Alternatively, each cell site may assign the IP address to devices within its cell. Thus, the cell site in cell 1 (or more particularly cell site equipment within cell 1 such as an enodeB) assigns IP address 1 and cell site equipment within cell 2 assigns IP address 2. If the cell site assigns the address, the cell site may utilize a dynamic host control protocol (DHCP) or other protocol to assign addresses. Regardless of how the mobile node obtains its new IP address, the cell site becomes the IP address egress point by assigning the address or providing just the prefix. That implies there is no longer a need for the PDN-Gateway in the core network to assign IP addresses or act as an IP anchor. As a mobile device moves, the mobile device obtains a new IP address for each cell and the need to maintain state and the current GTP-tunnel based approach to mobility management can be discarded greatly simplifying mobility management. Each cell is assigned a unique IP prefix, and the mobile node obtains different IP addresses when it attaches to different cell sites.

Figure 6:
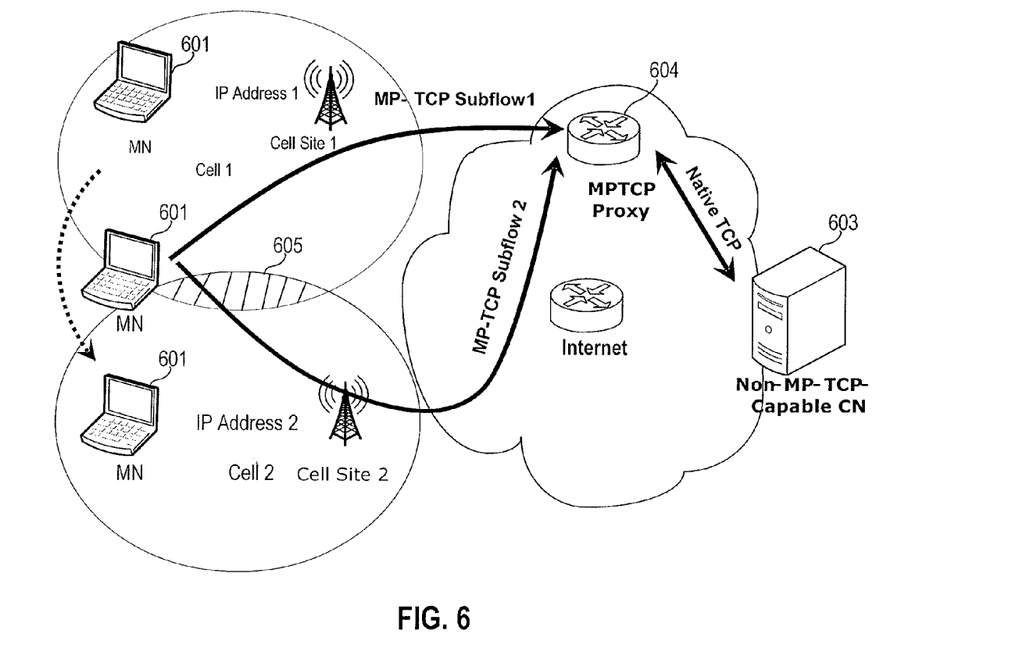
FIG. 6 illustrates an P-TCP variation using Proxy.

FIG. 6 illustrates an embodiment where the corresponding node is non MP-TCP compatible and therefore an intra-cellular MP-TCP with Proxy is utilized. MP-TCP Proxy addresses the problem of when a server is not MP-TCP capable, particularly in the near term. MP-TCP Proxy can be used to interwork with Non-MP-TCP-Capable corresponding nodes. In the scenario illustrated in FIG. 6, mobile node 601 is MP-TCP capable but the corresponding node 603 is non-MP-TCP capable. MP-TCP Proxy 604 works as a TCP-layer relay that intercepts all MP-TCP subflows and converts them into standard single-path TCP for non-MP-TCP-capable server 603. From the mobile operators' perspective, MP-TCP proxy may be deployed in the operator's network to give operators more control of traffic steering and management. For example, the proxy may be located in the network where the PDN-gateway is located in current LTE networks, in order to provide backward compatibility to conventional public Internet servers that are not MP-TCP capable. Alternatively, the MP-TCP proxy may be provided by web companies. In this case,MP-TCP proxy is placed in web company's data centers as the proxy of their conventional non-MP-TCP-capable servers. MP-TCP Proxy works as a TCP-layer relay. If the server is MP-TCP-capable, the proxy will signal the initiator host. Then direct MP-TCP data paths are set up without traversing through proxy.

Before moving, mobile node 601 is in cell 1 coverage area only and establishes one MP-TCP subflow using IP address 1. However, because the corresponding node is non-MP-TCP capable, the subflow is established with MP-TCP proxy 604, which in turn establishes a standard TCP connection with the corresponding node 603.

During mobility when the mobile node 601 has moved to the overlapped coverage area 605, mobile node 601 utilizes a new IP address 2 associated with cell 2 to set up a new MP-TCP subflow, while maintaining the original subflow of IP address 1. Two IP addresses are used simultaneously for MP-TCP connection. However, for smooth handover, the mobile node MP-TCP functionality should be able to dynamically shift traffic load between the two paths based on signal strength, mobility pattern, etc. After the mobile node has moved out of the cell 1 coverage area as determined, e.g., by signal strength from cell 1 signals, the mobile node closes the first MP-TCP subflow and uses only a single-path TCP using IP address 2 only.

Figure 7:
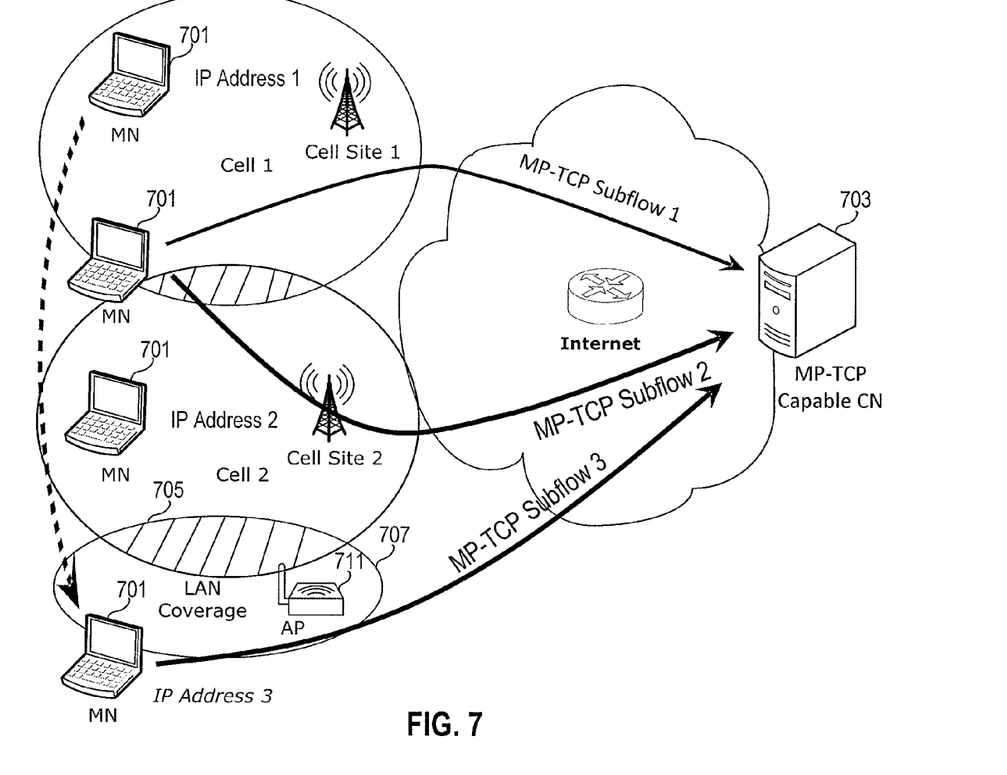
FIG. 7 illustrates an example of use of both Intra-Cellular and Inter-RAT MP-TCP.

FIG. 7 illustrates bath Intra-Cellular and Inter-RAT MP-TCP. In this example, the mobile device moves from cell 1 to cell 2 and then to another radio access technology, which in the example in FIG. 7 is a wireless local area network (WLAN) such as a WLAN complaint with 802.11. However, the other technology can be any other radio access technologies (e.g. 2G, 3G, LTE, WiMAX) or even wireline technology. Also there could be multiple MP-TCP subflows (more than two) running simultaneously. An MP-TCP Proxy may be used in this scenario if the corresponding node is not MP-TCP-capable. The movement from cell 1 to cell 2 is shown in FIG. 5 and the description is not repeated here. In cell 2, mobile device 701 has established MP-TCP subflow 2 and closed MP-TCP subflow 1. As mobile device 701 moves in the overlapped coverage area 705 with WLAN coverage area 707 the mobile device 701 receives a new address 3 from the WLAN access point 711. The mobile node 701 sets up a new MP-TCP subflow 3 using IP address 3, while maintaining the original subflow of IP address 2. Two IP addresses are used simultaneously for MP-TCP connection. However, for smooth handover, MP-TCP should be able to dynamically shift traffic load between the two paths based on signal strength, mobility pattern, etc. If the mobile node completely moves out of cell 2 coverage area, MP-TCP logic in the mobile node should close the second subflow, and switch to single-path TCP using IP address 3 only. If the mobile node remains covered by cell 2 after the move, then the mobile node may stay dual connected through MP-TCP and obtain greater throughput and/or reliability.

Figure 8:
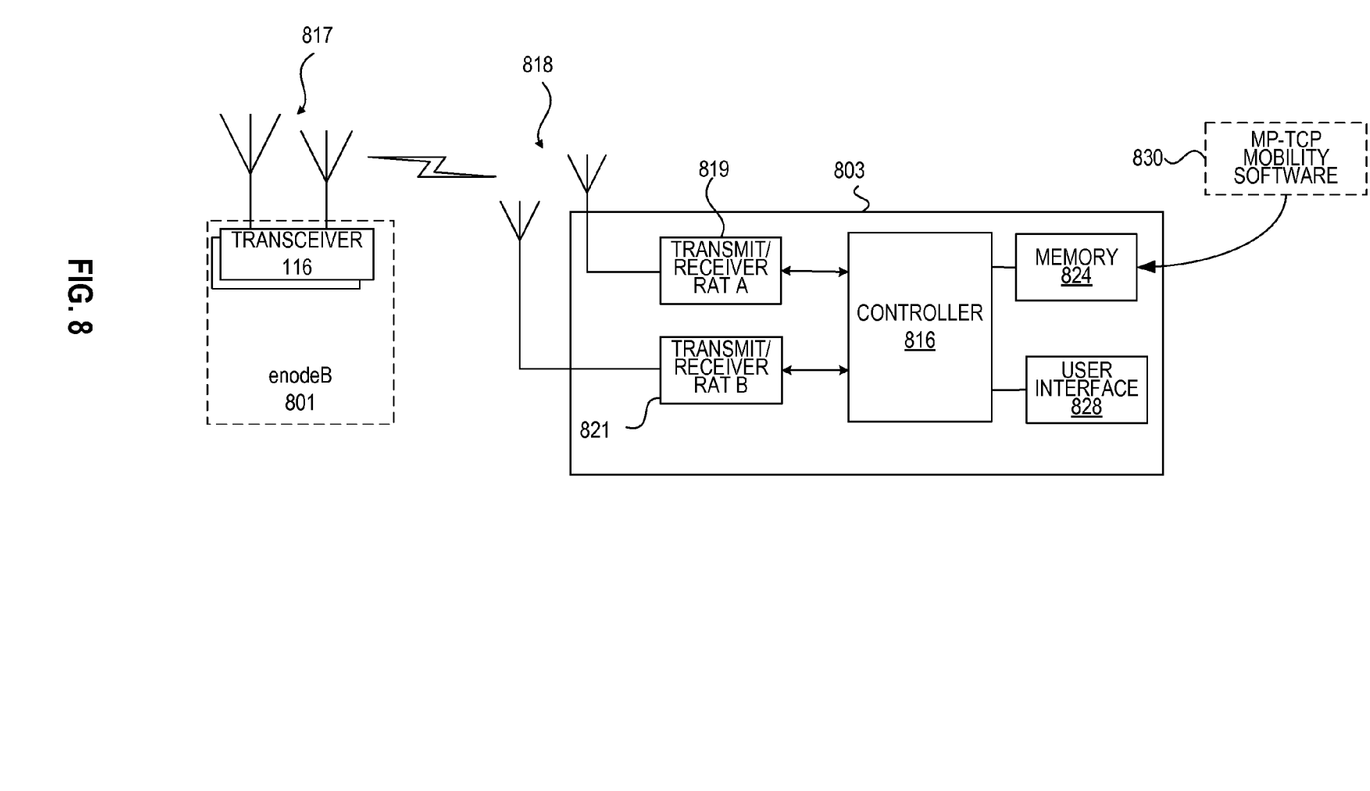
FIG. 8 illustrates high level block diagrams of the cell site and mobile node according to an embodiment.

FIG. 8 illustrates high level block diagrams of the cell site and mobile node shown, e.g., in FIGS. 5-7. The exemplary wireless system includes an enodeB 801 having one or more cellular antenna transceivers 816 and antennas 817 in communication with the mobile device 803 with one or more antennas 818. The enodeB is representative of the cell site electronics necessary to achieve the radio communications according to the protocols in place for the particular radio network. The enodeB and its associated electronics, computer control, antenna arrays and software to operate in accordance with appropriate telecommunications protocols (e.g., modulation, multiplexing, signal processing etc.) are well known in the art although functionally some of those components have been modified or enhanced as described herein in order to accommodate aspects of the various embodiments described herein such as broadcast of the cell prefix over a control channel. The enodeB is assumed to communicate in one or more of various cellular wireless technologies, e.g., LTE, to the mobile devices. However, other communication protocols may also be used and various embodiments of the disclosure may be applicable to various other wireless communications.

The components of the exemplary mobile device 803 are either generally known in the art or based on those generally known in the art, although functionally some of those components have been modified or enhanced as described herein with respect to the present disclosure. The mobile device 803 may be a mobile phone, laptop, tablet, wearable device, be installed in an automobile or in any number of other configurations. The mobile device 803 in the illustrated embodiment is shown to have capability to communicate in two radio access technologies 819 and 821 (RAT A and RAT B). In an exemplary embodiment RAT A 819 is a cellular radio access technology and RAT B 821 is a local area network radio access technology. Alternatively, in another example, RAT A may be LTE and RAT B 5G. The mobile device 803 includes a controller 816, such as a processor, microcontroller or similar data processing device that executes program instructions stored in a memory 824. Typical transmitter functions including coding, mapping, and modulation are known in the art and are therefore not shown in any detail. Typical receiver functions, which are well known in the art and therefore not shown in any detail, include, e.g., intermediate frequency to baseband conversion, demodulation, constellation demapping, decoding, and/or descrambling according to the particular RF protocols and technology being employed. The receiver functions may be implemented in various combinations of analog and digital logic. In particular, the transmit and receiver functions may use digital signal processing and controller 816 represents the necessary digital signal processing capability to implement necessary digital signal processing functions, even though one or more separate digital signal processors may be provided in mobile device 803.

The memory 824 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

The controller 816 may be implemented as a single special purpose integrated circuit (e.g., ASIC) having a main or central processor unit for overall, system-level control, and separate sections dedicated to performing various specific computations, functions and other processes under the control of the central processor unit. The controller 816 can also be implemented as a single microprocessor circuit, a digital signal processor (DSP), or a plurality of separate dedicated or programmable integrated or other electronic circuits or devices, e.g., hardwired electronic or logic circuits such as discrete element circuits or programmable logic devices. The controller 816 may also include other circuitry or components, such as memory devices, relays, mechanical linkages, communications devices, drivers and other ancillary functionality to affect desired control and/or input/output functions.

The controller 816 is operatively coupled with user interface 828. The user interface 828 may include items known in the art, such as a display, keypad, speaker, microphone, and other user interface I/O components. In one embodiment the controller 816 provides functionality to achieve mobility management using MP-TCP. In the illustrated embodiment the controller utilizes MP-TCP. In the illustrated embodiment the controller utilizes software functionality 830 stored in memory 824 to implement at least a portion of the MP-TCP logic necessary to achieve the correct MP-TCP functionality as described herein and including detecting and setting up new paths (path management), breaking application-layer byte stream into segments for each subflow (packet scheduling), reassembling and re-ordering subflow segments into connection-level data stream (subflow interface), and coordinating congestion control across subflows (congestion control). In addition, the software functionality may be used to create a new IP address based on a prefix received over a control channel through receiver/transmitter 819 and manage congestion control, closing subflows when signal strength indicate the subflow should be closed and other functionality described herein. While software may be used to implement aspects of MP-TCP mobility control in the cell phone, some aspects, such as signal strength measurement and establishing subfloors utilize at least some hardware circuits and the particular segmentation between software and hardware control is implementation specific and thus can vary in different embodiments. Similarly, the enodeB has the necessary processing logic, memory, and other associated required circuits to implement the functionality described herein, such as transmitting an assigned prefix to the cell over a control channel.

Figure 9:
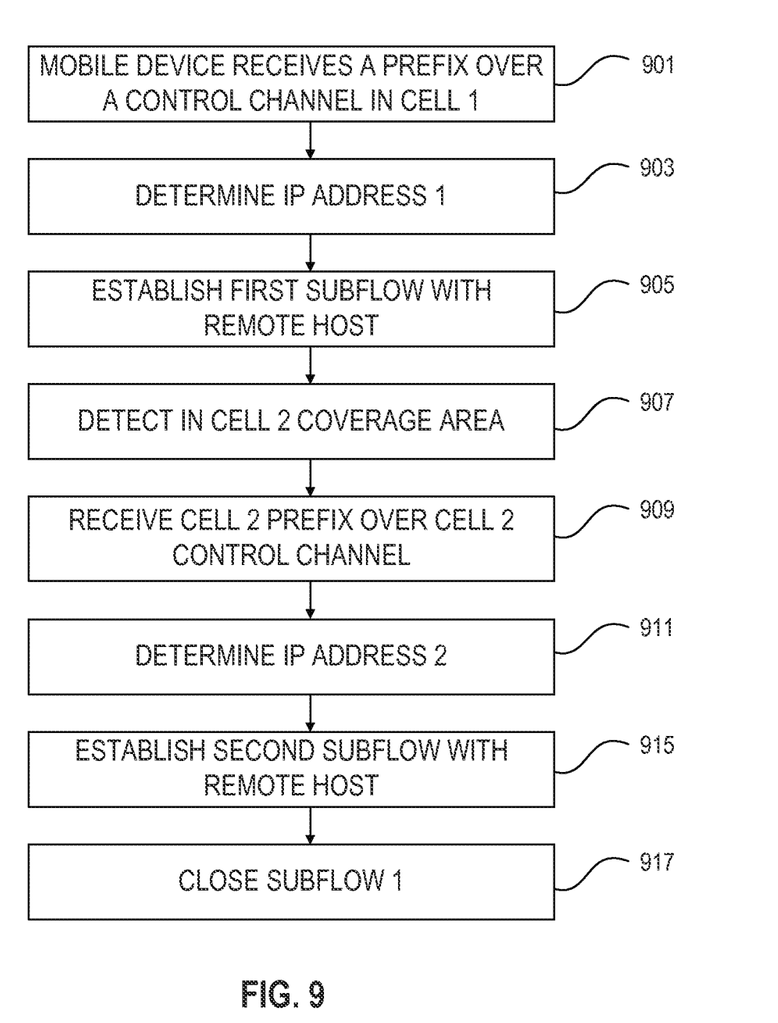
FIG. 9 is a flow chart illustrating an embodiment of a mobility operation using operation MP-TCP.

FIG. 9 is a flow chart illustrating operation of mobile device 801 in the example provided in FIG. 5. In an embodiment the illustrated operations in FIG. 9 (and other embodiments described herein) are controlled by software stored in the mobile device that executes on one or more processors in the mobile device 801. In other embodiments, the control function illustrated in FIG. 9 and other embodiments described herein may be implemented using a mixture of hardware and software executing on the one or more processors according to the needs of a particular implementation. In 901, the mobile device receives a prefix over a control channel while in cell 1. At 903, the mobile device determines its IP address (IP 1) based on the cell 1 prefix and e.g., its MAC address. At 905, the mobile device establishes a first subflow to a remote host using IP 1. At 907, the mobile device detects it is in an overlap region based on, e.g., signal strength of signals transmitted in cell 2. The mobile device receives the cell 2 prefix over a control channel in cell 2 at 909. At 911, the mobile device determines its second IP address (IP 2) based on the cell 2. prefix and, e.g., its MAC address. At 915, the mobile device establishes a second subflow to a remote host using IP 1. At 917, the mobile device determines that it has left cell 1, based, e.g., on signal strength of signals transmitted on cell 1 and closed the first subflow. In that way, the mobile device has moved from cell 1 to cell 2 with limited involvement of the core network other than to provide a communication path for the subflows. Also, since the mobility management functions are realized by end hosts as opposed to the network-centric approach in today's cellular network, much less state information of the user device is required to be maintained by the network, thus making the MP-TCP approach of the various embodiments described herein very sealable and thus able to handle the billions of emerging machine-type devices of Internet-of-Things, where many user devices are not mobile, or occasionally mobile smart meters, etc.)

Thus, aspects of mobility management using of MP-TCP have been described. The description set forth herein is illustrative, and is not intended to limit the scope of the following claims. Variations and modifications of the embodiments disclosed herein may be made based on the description set forth herein, without departing from the scope and spirit of the following claims.

What is claimed is:

1. A method for mobility management of a mobile device comprising:
   the mobile device receiving over a first cell site control channel a first prefix sent by a first cell site equipment serving a first coverage area, the first prefix being sent independently of a first internet protocol (IP) address; and
   the mobile device determining the first IP address based on the first prefix and an identifier associated with the mobile device;
   establishing a first multipath-transfer control protocol (MP-TCP) subflow to a corresponding node from the mobile device in the first coverage area using the first IP address;
   as the mobile device moves to a second coverage area served by a second cell site equipment, the mobile device receiving in an overlapped coverage area including a first portion of the first coverage area and a second portion of the second coverage area, a second prefix sent by the second cell site equipment over a second cell site control channel;
   the mobile device determining a second IP address based on the second prefix and the identifier associated with the mobile device;
   establishing a second MP-TCP subflow using the second IP address while the mobile device is in the overlapped coverage area; and
   the mobile device making a determination to close the first MP-TCP subflow based on a signal strength of a transmission from the first cell site equipment being below a threshold.

2. The method as recited in claim 1 comprising maintaining the first MP-TCP subflow after the second MP-TCP subflow has been established while in the overlapped coverage area.

3. The method as recited in claim 1,
   wherein the first prefix is unique to the first coverage area and the second prefix is unique to the second coverage area.

4. The method as recited in claim 1, further comprising:
   establishing the first and second MP-TCP subflows to the corresponding node through an MP-TCP proxy.

5. The method as recited in claim 1,
   wherein the first MP-TCP subflow is established through the first cell site equipment; and
   wherein the second MP-TCP subflow is established through the second cell site equipment.

6. The method as recited in claim 1 further comprising:
   the mobile device entering a third coverage area of another radio access technology;
   the mobile device receiving a third internet address assigned by an access point serving the third coverage area; and
   the mobile device establishing a third subflow to the corresponding node using the other radio access technology.

7. The method as recited in claim 1 further comprising the first cell site equipment broadcasting the first prefix over the first cell site control channel.

8. The method as recited in claim 1 further comprising the second cell site equipment broadcasting the second prefix over the second cell site control channel.

9. The method as recited in claim 1 wherein the identifier associated with the mobile device is a media access control address associated with the mobile device.

10. A mobile device comprising:
    multipath transfer control protocol (MP-TCP) processing logic responsive to a request for a TCP-IP connection to establish a first multipath-transfer control protocol (MP-TCP) subflow to a corresponding node using a first internet protocol (IP) address associated with a first cell site equipment while the mobile device is in a first coverage area served by the first cell site equipment, wherein the mobile device is configured to form the first IP address using an identifier uniquely associated with the mobile device and a first prefix received by the mobile device over a first cell site control channel from the first cell site equipment, the first prefix being sent independently of the first IP address and corresponding to the first coverage area; and the MP-TCP processing logic responsive to the mobile device being in an overlapped coverage area between the first coverage area served by the first cell site equipment and a second coverage area served by a second cell site equipment, to cause the mobile device to establish a second MP-TCP subflow using a second IP address;

wherein the mobile device is configured to form the second IP address using the identifier uniquely associated with the mobile device and a second prefix received by the mobile device over a second cell site control channel from the second cell site equipment, the second prefix being sent independently of the second IP address and corresponding to the second coverage area.

11. The mobile device as recited in claim 10 wherein the MP-TCP processing logic is responsive to a determination that a signal strength of a signal transmitted by the first cell site equipment is below a threshold to close the first MP-TCP subflow.

12. The mobile device as recited in claim 10 wherein the first IP address and second IP address are formed utilizing a media access control address of the mobile device as the identifier uniquely associated with the mobile device.

13. A non-transitory computer readable storage comprising computer-executable instructions that, in response to execution, cause a system comprising a processor to perform operations to:

form a first internet protocol (IP) address using an identifier uniquely associated with a mobile device on which the processor is disposed and a first prefix transmitted by a first cell site equipment serving a first coverage area over a first cell site control channel, the first prefix being sent independently of the first IP address and corresponding to the first coverage area;

establish a first multipath-transfer control protocol (MP-TCP) subflow to a corresponding node from the mobile device in the first coverage area using the first IP address;

form a second IP address using the identifier uniquely associated with the mobile device and a second prefix sent by a second cell site equipment serving a second coverage area over a second cell site control channel, the second prefix being sent independently of the second IP address and corresponding to the second coverage area;

establish a second MP-TCP subflow to the corresponding node using the second IP address in response to the mobile device moving to an overlapped coverage area between the first coverage area and the second coverage area; and close the first MP-TCP subflow based on a signal strength of a transmission from the first cell site equipment being below a threshold.

* * * * *